United States Patent
Kumar et al.

(10) Patent No.: US 9,689,298 B2
(45) Date of Patent: Jun. 27, 2017

(54) INTEGRATED FUEL CATALYST MONITOR

(71) Applicant: Ford Global Technologies, LLC, Dearborn, MI (US)

(72) Inventors: Pankaj Kumar, Dearborn, MI (US); Imad Hassan Makki, Dearborn Heights, MI (US); Brent Edward Sealy, Plymouth, MI (US); Michael Casedy, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 352 days.

(21) Appl. No.: 14/512,967

(22) Filed: Oct. 13, 2014

(65) Prior Publication Data

US 2016/0102594 A1    Apr. 14, 2016

(51) Int. Cl.
| | |
|---|---|
| *F01N 11/00* | (2006.01) |
| *F02D 41/12* | (2006.01) |
| *F02D 41/14* | (2006.01) |
| *F02D 41/02* | (2006.01) |

(52) U.S. Cl.
CPC ........ *F01N 11/007* (2013.01); *F02D 41/0295* (2013.01); *F02D 41/123* (2013.01); *F02D 41/1441* (2013.01); *F02D 41/1454* (2013.01); *F01N 2550/02* (2013.01); *F01N 2560/025* (2013.01); *F01N 2560/14* (2013.01); *F01N 2900/0601* (2013.01); *Y02T 10/47* (2013.01)

(58) Field of Classification Search
CPC ........ Y02T 10/47; Y02T 10/22; F01N 11/007; F01N 11/00; F01N 2560/20; F02D 41/1441; F02D 41/1454; F02D 41/123; F02D 41/0295

USPC .......................................................... 73/114.72
See application file for complete search history.

(56) References Cited

U.S. PATENT DOCUMENTS

| | | | |
|---|---|---|---|
| 6,449,943 B1* | 9/2002 | Ueno | F01N 11/007 60/274 |
| 6,594,986 B2 | 7/2003 | Ingram et al. | |
| 7,284,368 B2 | 10/2007 | Surnilla et al. | |
| 7,900,439 B2* | 3/2011 | Genslak | F01N 9/00 123/688 |
| 8,516,796 B2* | 8/2013 | Wald | F01N 3/10 60/274 |
| 8,756,915 B2 | 6/2014 | Sealy et al. | |
| 8,800,356 B2 | 8/2014 | Makki et al. | |
| 9,097,166 B2* | 8/2015 | Makki | F01N 11/00 |
| 9,328,646 B2* | 5/2016 | Sealy | F01N 11/007 |
| 2002/0029561 A1* | 3/2002 | Ueno | F01N 11/007 60/277 |
| 2008/0302087 A1* | 12/2008 | Genslak | F01N 9/00 60/277 |

(Continued)

*Primary Examiner* — Freddie Kirkland, III
(74) *Attorney, Agent, or Firm* — Julia Voutyras; McCoy Russell LLP

(57) ABSTRACT

A method is provided for monitoring an emission control device coupled to an engine. In one example approach, the method comprises, following a deceleration fuel shut-off (DFSO) duration, indicating degradation of an emission device based on an amount of rich products required to cause a sensor to become richer than a first threshold, the indicating carried out when DFSO duration is greater than a second threshold. The method also comprises an integration which is based on inlet air-fuel ratio, the integration starting only after a pre-catalyst sensor reaches stoichiometry.

19 Claims, 8 Drawing Sheets

(56) References Cited

U.S. PATENT DOCUMENTS

| | | | |
|---|---|---|---|
| 2011/0120095 A1* | 5/2011 | Wald | F01N 3/10 60/276 |
| 2013/0180509 A1 | 7/2013 | Makki et al. | |
| 2013/0245919 A1 | 9/2013 | Kumar et al. | |
| 2014/0283589 A1 | 9/2014 | Makki et al. | |
| 2014/0336899 A1 | 11/2014 | Uhrich et al. | |

* cited by examiner

US 9,689,298 B2

INTEGRATED FUEL CATALYST MONITOR

FIELD

The present disclosure relates to a catalyst monitoring system.

BACKGROUND AND SUMMARY

Emission control devices, such as a three-way catalyst, coupled to an exhaust of a combustion engine reduce combustion by-products such as carbon monoxide, hydrocarbons, and oxides of nitrogen. To reduce emissions, catalyst monitoring methods may be used to detect when an emission control device has reached its threshold use and is to be replaced. Reliable catalyst monitoring may reduce costs by decreasing erroneous characterization of a useful catalyst as an expended catalyst, or may reduce emissions by decreasing erroneous characterization of a degraded catalyst as a useful catalyst.

Various approaches for catalyst monitoring have been developed including methods provided for monitoring an emission control device comprising following a deceleration fuel shut-off duration, indicating degradation of the emission control device based on an integrated air-fuel ratio method and a steady-state based index ratio diagnostic method. As such, the integrated air-fuel ratio method estimates an amount of fuel mass that may be consumed to react with stored oxygen in the catalyst for a post-catalyst sensor breakthrough.

The inventors herein have recognized an issue with the above approach. Namely, the integrated air-fuel ratio method may be more sensitive to noise in measurement of air-fuel ratio. For example, the integrated air-fuel ratio method uses a calibrated air-fuel ratio in the calculation until a pre-catalyst gas sensor reaches stoichiometry, instead of a measured air-fuel ratio from the pre-catalyst gas sensor. Additional noise may be introduced in the calculation by using a constant value for the calibrated air-fuel ratio.

One approach that at least partially addresses the above issue includes a method comprising, following a deceleration fuel shut-off (DFSO) duration, indicating degradation of an emission device based on an amount of rich products required to cause a sensor to become richer than a first threshold, the indicating carried out when DFSO duration is greater than a second threshold, an integration based on inlet air-fuel ratio starting only after the inlet air-fuel ratio reaches stoichiometry. In this way, a measured air-fuel ratio may be used in the integration enabling a reduction in noise and errors.

For example, a catalyst monitor may be activated after a DFSO event in an engine. A catalyst in the engine may store oxygen during the DFSO event and the catalyst monitor may compute an amount of fuel mass required to react with the stored oxygen. As such, the fuel mass may signal an age of the catalyst. The amount of fuel mass may be calculated as the fuel delivered to the catalyst from a first time when a pre-catalyst sensor indicative of inlet air-fuel ratio reaches stoichiometry until a second time when a post-catalyst sensor reaches a first threshold. The first threshold, in one example, may be stoichiometry. An integration calculation may be utilized to compute the fuel mass, the integration calculation starting from the first time and ending at the second time. Thus, an amount of fuel delivered to the catalyst before the pre-catalyst sensor reaches stoichiometry may be disregarded and may not be included in the integration calculation.

In this way, the integrated air-fuel ratio method may be utilized to detect a catalyst that has reached its threshold use in a more reliable manner. By commencing the calculation when the pre-catalyst sensor reaches stoichiometry, only the amount of fuel that reacts with stored oxygen in the catalyst may be estimated. Further, by using a measured inlet air-fuel ratio instead of a calibrated air-fuel ratio, the calculation may be less sensitive to noise and may provide a more robust catalyst monitoring method. Accordingly, a more accurate prediction of a state of the catalyst may be achieved. As such, erroneous characterization of a degraded catalyst as a useful catalyst (and vice versa) may be reduced. Overall, expenses associated with such errors may be reduced, and emissions may be lowered.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
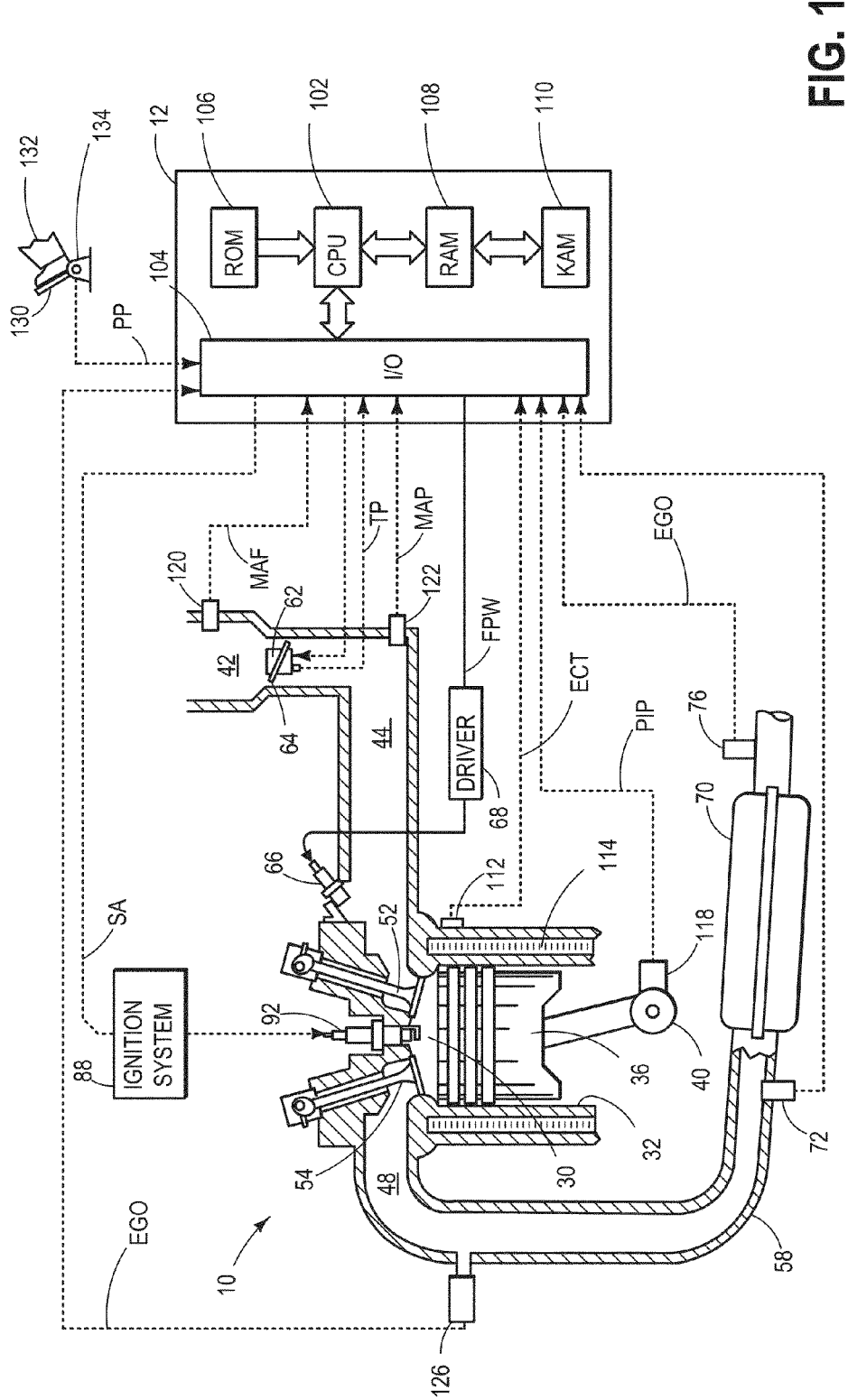
FIG. 1 shows a schematic diagram of an example cylinder of a multi-cylinder engine with an emission control device coupled to an engine exhaust system.
Figure 5:
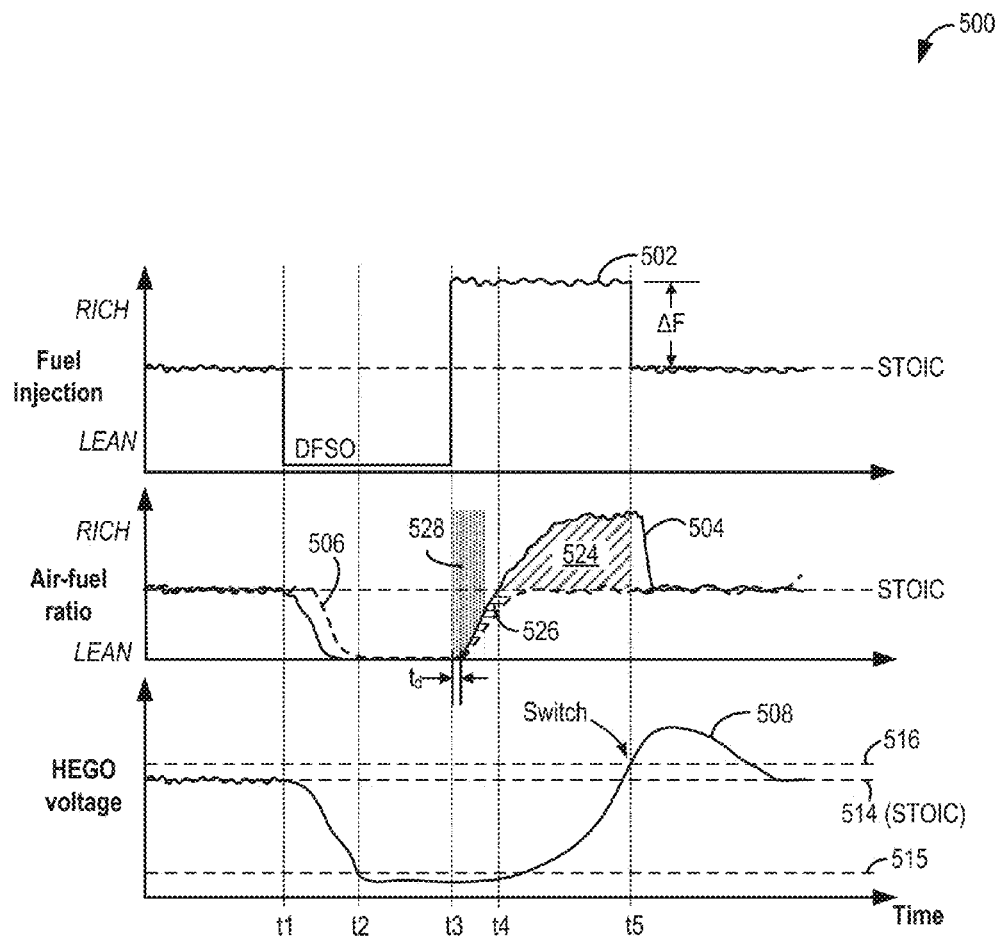
FIG. 5 shows an example timeline for a catalyst monitoring method, in accordance with the present disclosure.
Figure 6:
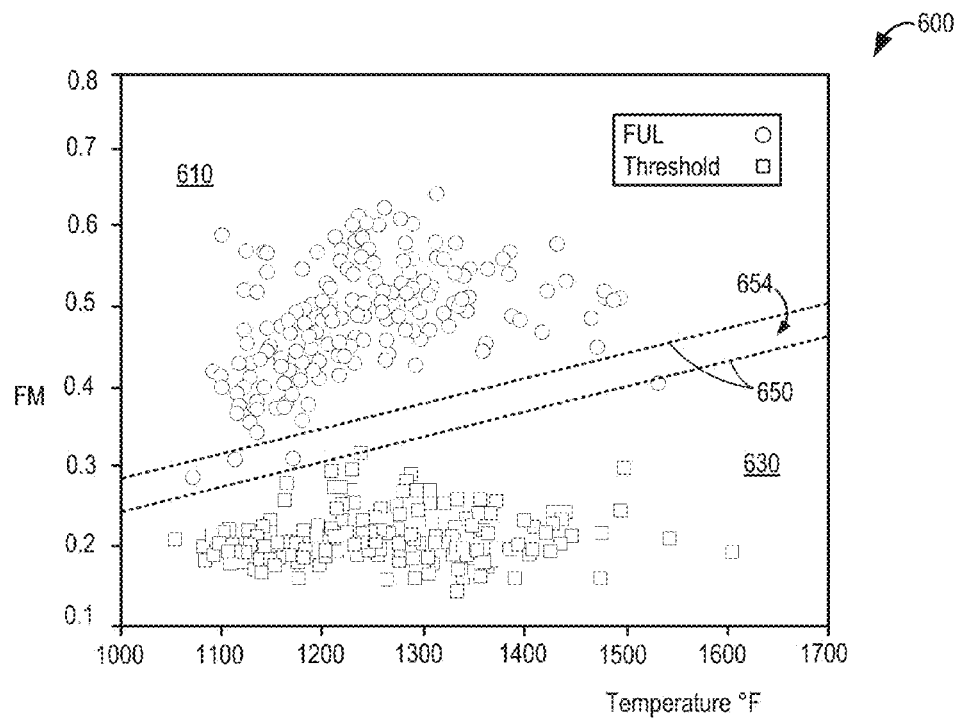
FIG. 6 shows an example plot corresponding to a support vector machine classification of a useful catalyst and a threshold catalyst using a first method.
Figure 7:
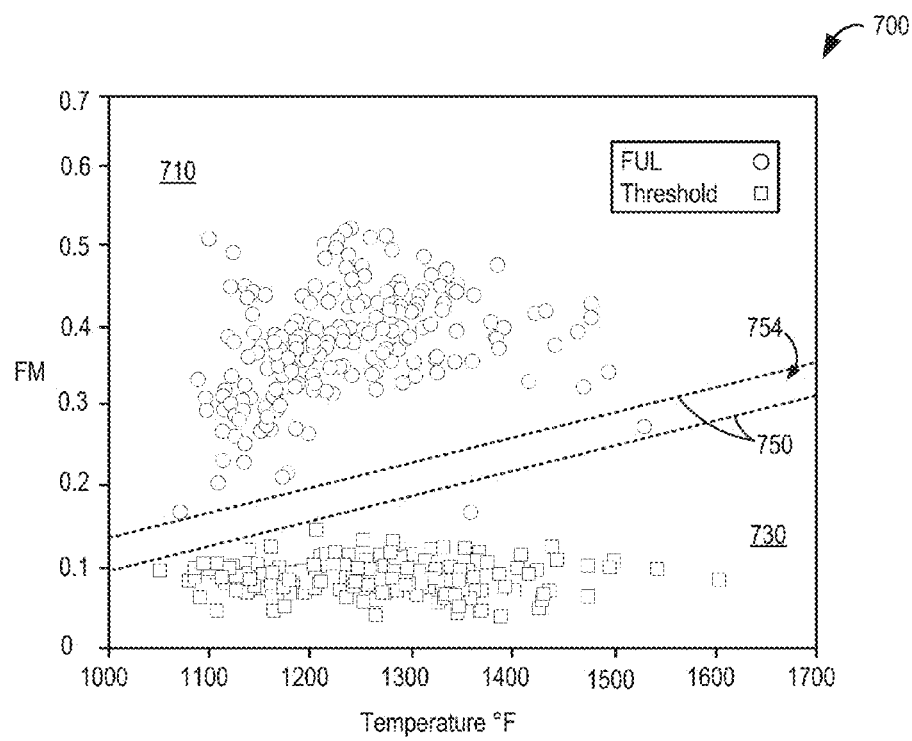
FIG. 7 presents an example plot corresponding to a support vector machine classification of a useful catalyst and a threshold catalyst using a second method according to the present disclosure.
Figures 8, 9:
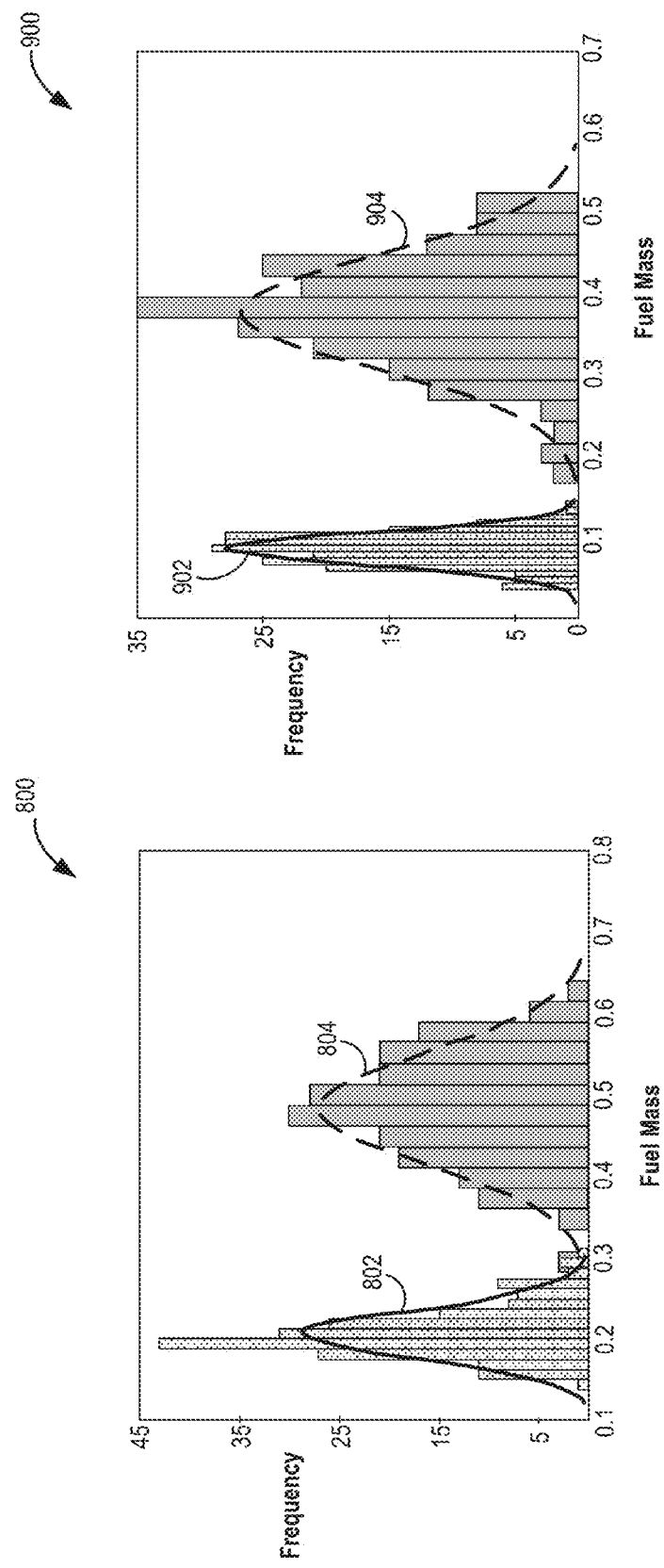
FIGS. 8 and 9 show example histograms corresponding to a support vector machine classification using the first method and the second method.
Figure 10:
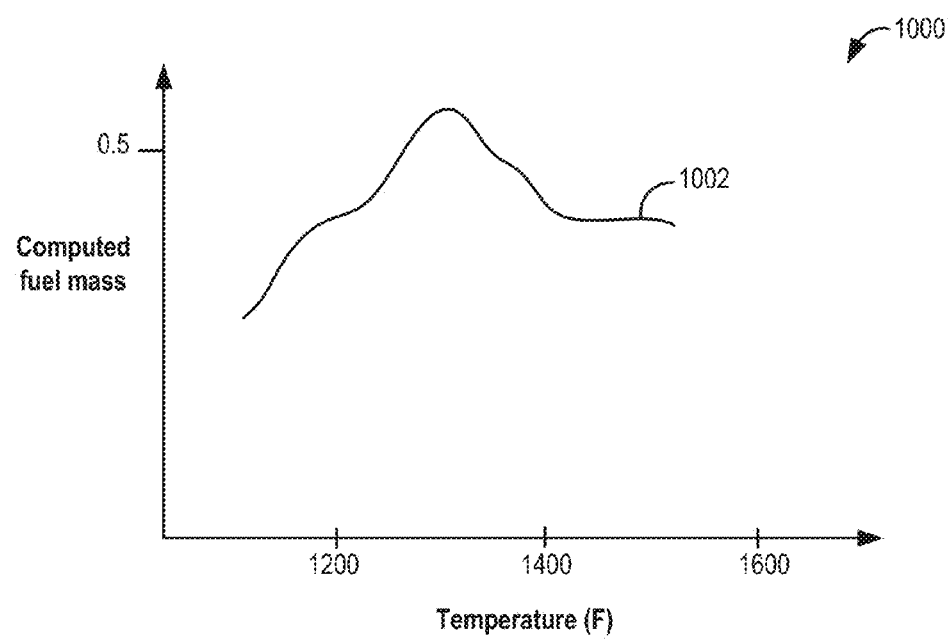
FIG. 10 depicts an example variation in calculated fuel mass with temperature.
Figure 11:
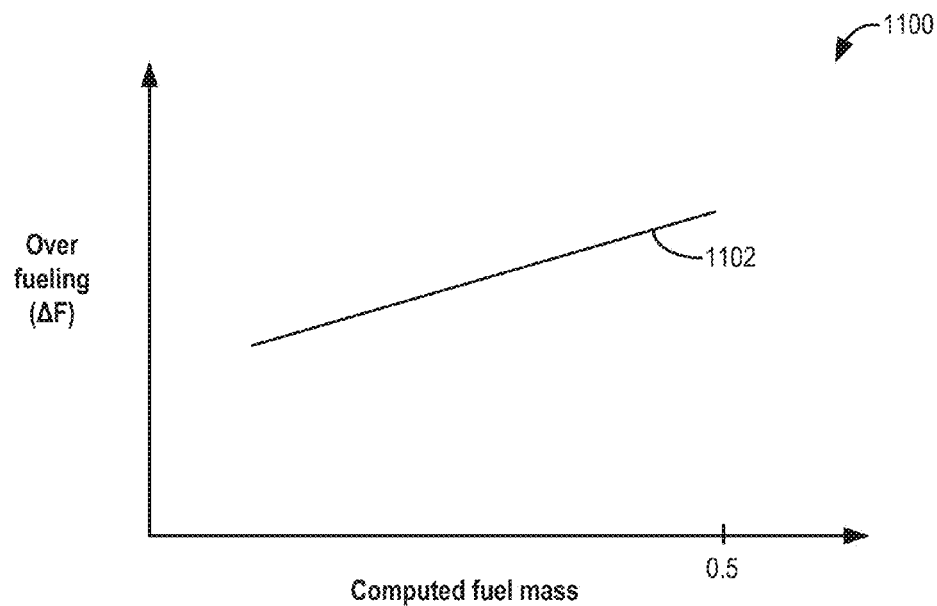
FIG. 11 portrays a relationship between over-fueling and the calculated fuel mass.

The following description relates to a system and method for monitoring an emission control device (e.g. three-way catalyst) following a deceleration fuel shut-off (DFSO) event in an engine, such as the engine in FIG. 1. A catalyst monitoring routine may be initiated following a DFSO event, and following a driver tip-in to exit out of the DFSO event. An example catalyst monitoring method shown in FIGS. 2-4 determines a total fuel mass (FM) injected in the catalyst based on an integration calculation of air mass flow (AM) and air-fuel ratio upstream of the emission control device (e.g. feedgas air-fuel ratio). The integration calculation is performed from when an upstream sensor reaches stoichiometry until a downstream air-fuel sensor switch (FIG. 5). The downstream air-fuel sensor may be a full volume sensor or a partial volume sensor. A support vector machine (SVM) algorithm may be used to classify the FM computation for determining and providing an indication of catalyst degradation. The SVM algorithm may include a clustering algorithm and a buffer region to increase the robustness and to reduce memory usage. FIGS. 6 and 7 illustrate the buffer regions when using a first catalyst monitor method and a second catalyst monitor method. FIGS. 8 and 9 show a distribution of FM data obtained using the first catalyst monitor method and the second catalyst monitor method respectively. An example calculated FM for a full useful life (FUL) emission control device is depicted in FIG. 10. An amount of over-fueling following the DFSO event for the downstream air-fuel sensor switch may increase linearly with the total fuel mass (FIG. 11).

Regarding terminology used throughout this detailed description, an exhaust gas sensor or an oxygen sensor located upstream of the emission control device may be termed a pre-catalyst sensor or an upstream sensor. The upstream sensor may measure a feedgas air-fuel ratio. In other words, the upstream sensor may measure an inlet air-fuel ratio at the inlet of the emission control device. Likewise, an exhaust gas sensor or an oxygen sensor positioned downstream of the catalyst may be referred to as a downstream sensor or as a post-catalyst sensor. The downstream sensor may measure an air-fuel ratio of gases exiting the emission control device.

Turning to FIG. 1, a schematic diagram showing one cylinder of multi-cylinder engine 10, which may be included in a propulsion system of a vehicle, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber 30 (also termed, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 58 upstream of emission control device 70. Sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 58 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio. Full-volume exhaust gas sensor 76 is shown coupled to exhaust passage 58 downstream of emission control device 70. Sensor 76 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Further, a plurality of exhaust gas sensors may be located at partial volume locations within the emission control devices. As an example, the embodiment may include a mid-bed sensor to detect air-fuel ratio in the middle of the catalyst.

Other sensors 72 such as an air mass flow (AM) and/or a temperature sensor may be disposed upstream of emission control device 70 to monitor the AM and temperature of the exhaust gas entering the emission control device. The sensor locations shown in FIG. 1 are just one example of various possible configurations. For example, the emission control system may include a partial volume set-up with close coupled catalysts.

Controller 12 is shown in FIG. 1 as a microcomputer, including microprocessor unit 102, input/output ports 104, an electronic storage medium for executable programs and calibration values shown as read only memory 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; airmass and/or temperature of the exhaust gas entering the catalyst from sensor 72; exhaust gas air-fuel ratio post-catalyst from sensor 76; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft. Additionally, controller 12 may communicate with a cluster display device 136, for example to alert the driver of faults in the engine or exhaust after-treatment system.

Storage medium read-only memory 106 can be programmed with computer readable data representing instructions executable by processor 102 for performing the methods described below as well as other variants that are anticipated but not specifically listed.

Figure 2:
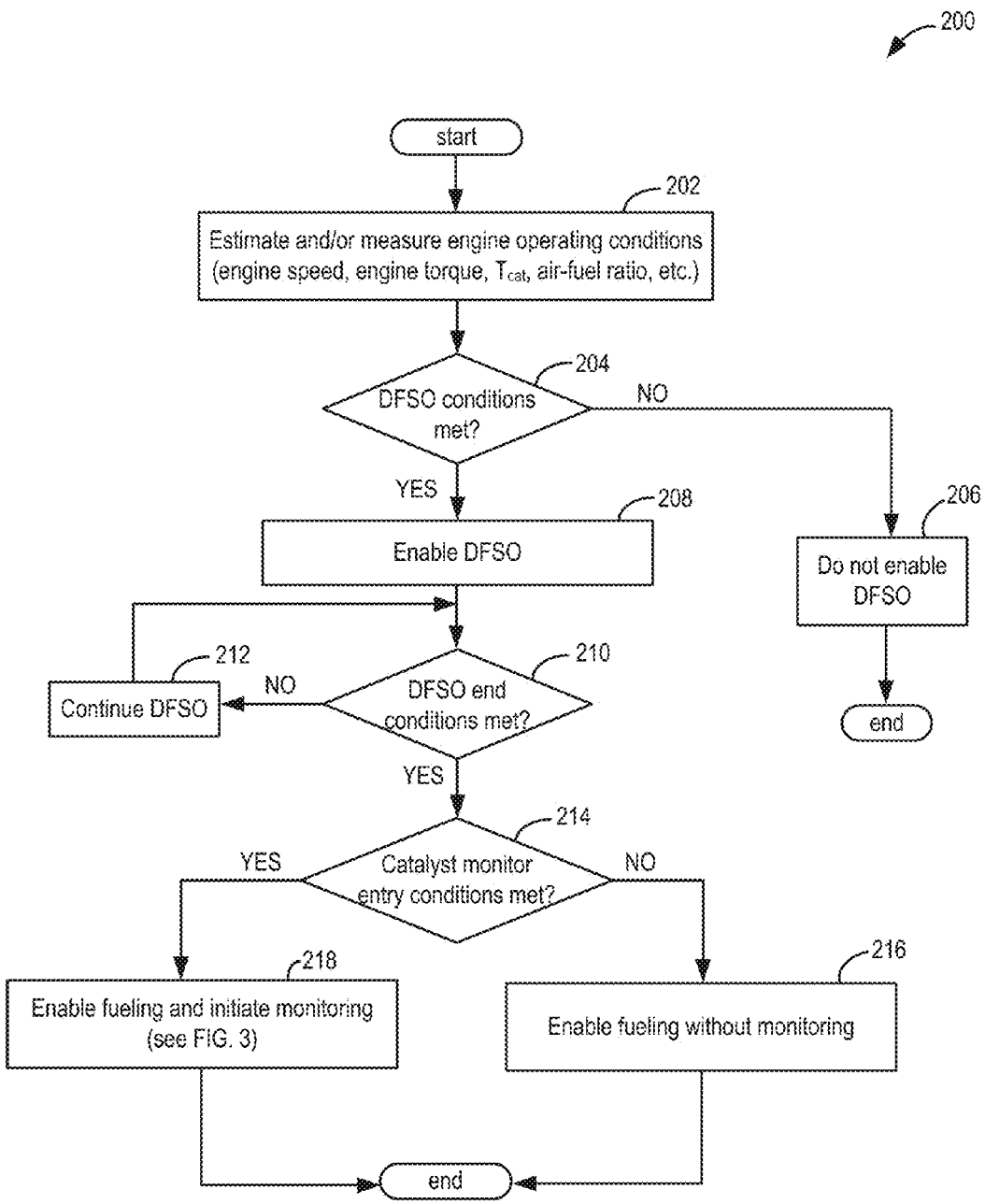
FIGS. 2-4 show flow charts for an example catalyst monitoring method according to the present disclosure.

Turning now to FIG. 2, an example routine 200 is shown for initiating catalyst monitoring following a DFSO duration. Specifically, the catalyst in the example engine may be monitored only when certain conditions are met. For example, the monitor may be based on a concept that as the catalyst ages, its oxygen storage capacity is reduced. Instead of estimating the reduction in storage capacity, the integrated air-fuel ratio method computes a fuel mass required to react with the stored oxygen. Therefore, the catalyst monitor may be initiated only when the catalyst is saturated with oxygen.

At 202, engine operating conditions may be estimated and/or measured. For example, engine conditions such as engine speed, torque, air-fuel ratio, catalyst temperature ($T_{cat}$), etc. may be estimated and/or measured. Further, the engine may be operated substantially at stoichiometry before a DFSO event.

At 204, routine 200 determines whether DFSO entry conditions are met. DFSO entry conditions may be based on various vehicle and engine operating conditions. In particular, the routine may use a combination of one or more of vehicle speed, vehicle acceleration, engine speed, engine load, throttle position, pedal position, transmission gear position, and various other parameters to determine whether DFSO entry conditions have been met at 204. In one example, the DFSO entry conditions may be based on an engine speed below a threshold. In another example, the DFSO entry conditions may be based on an engine load below a threshold. In still another example, the DFSO condition may be based on an accelerator pedal position.

If entry conditions for DFSO are not met, routine 200 progresses to 206 to not enable DFSO and routine 200 ends. Thus, a DFSO event may not occur. If, however, DFSO entry conditions are met at 204, routine 200 proceeds to 208 and enables DFSO. During DFSO, the engine may be operated without fuel injection while the engine rotates and pumps air through the emission control device. During this time, the catalysts in the emission control device may be reactivated with oxygen.

The DFSO event may persist until conditions are met for exiting out of DFSO. For example, a DFSO event may be ended based on a driver tip-in or when vehicle speed reaches a threshold value. At 210, routine 200 determines whether conditions are met for ending DFSO. If conditions are not met for exiting out of DFSO, routine 200 proceeds to 212 and continues the DFSO event. Further, various engine and vehicle operating parameters may be monitored which may indicate ending the DFSO event. For example, the routine may monitor pedal position. If conditions for exiting out of DFSO are met at 210, for example in response to a driver tip-in, vehicle speed reaching a threshold value, and/or engine load reaching a threshold value, routine 200 proceeds to 214.

At 214, it may be determined whether catalyst monitor entry conditions are met. For example, an entry condition for activating catalyst monitoring may be a DFSO duration that is long enough to saturate the catalysts in the emission control device with oxygen. By initiating catalyst monitoring only when the catalysts are adequately saturated with oxygen, an accuracy of the catalyst monitoring routine may be improved. For example, if the catalyst in the emission device is not sufficiently saturated before running the catalyst monitoring routine, an erroneous indication of degradation may be provided. In one example, routine 200 may activate the catalyst monitor if the duration of the DFSO is greater than a threshold duration. The threshold may be based on a reading of a downstream heated exhaust gas oxygen sensor (HEGO) being lean at or before an end of the DFSO duration. In another example, an entry condition for the catalyst monitor may be an output voltage from the downstream HEGO sensor that is less than a threshold lean voltage. The HEGO sensor output voltage being less than the threshold lean voltage may be one indication that the DFSO duration was sufficiently long to saturate the catalysts. In yet another example, an entry condition for the catalyst monitor may be the HEGO sensor output voltage being less than the threshold lean voltage for a duration longer than a threshold time.

If entry conditions to initiate the catalyst monitor are not met at 214, for example if the DFSO event was not long enough, routine 200 proceeds to 216. At 216, fueling may be enabled without initiating the catalyst monitoring and routine 200 ends. However, if entry conditions to initiate the catalyst monitoring routine are met at 214, for example, if the HEGO sensor output voltage was lower than the threshold lean voltage for the threshold time, routine 200 proceeds to 218. At 218, fueling is enabled and catalyst monitoring is initiated which will be further described in reference to FIG. 3. Routine 200 then ends.

Figure 3:
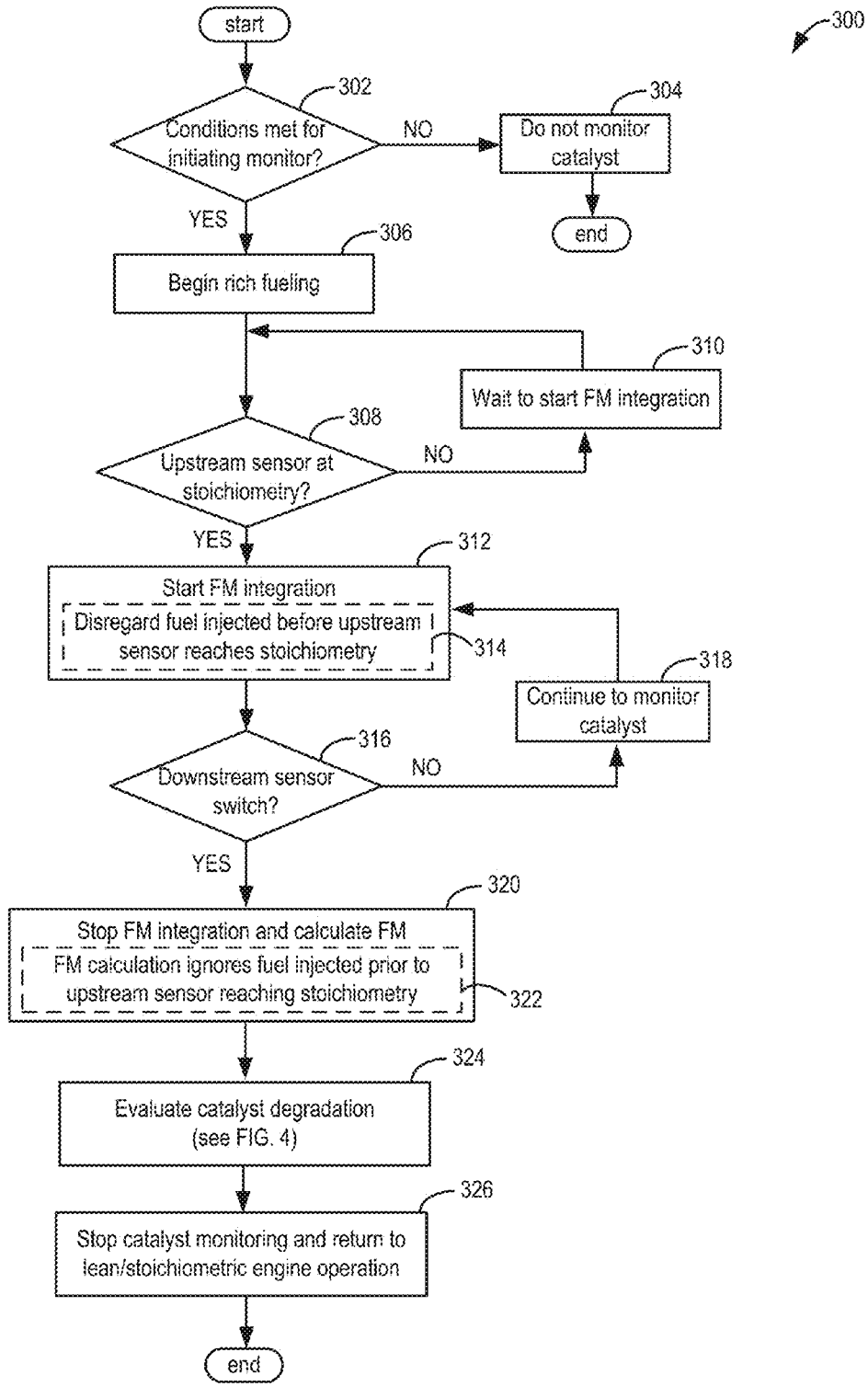

Routine 300 of FIG. 3 illustrates an example catalyst monitoring routine. Specifically, an amount of rich products required to cause a sensor to become richer than a threshold is calculated. The calculated amount of rich products does not include a portion of rich products delivered to the emission device until an upstream sensor reaches stoichiometry.

At 302, it may be determined by routine 300 if conditions to initiate the catalyst monitor are met. As described earlier, the conditions may include one of a sufficiently long DFSO event to saturate the catalyst(s) with oxygen, an output of a HEGO sensor that is leaner than a threshold lean voltage, and the HEGO sensor output being less than the threshold lean voltage for longer than a threshold time. In the example of the entry condition being the sufficiently long DFSO event, the DFSO duration may be greater than a second threshold.

If conditions to initiate the catalyst monitor are not met, routine 300 continues to 304 to not monitor the catalyst and ends. If, on the other hand, it is confirmed that conditions to initiate the catalyst monitor are met, routine 300 proceeds to 306 to begin rich fueling. Rich fueling may be initiated in response to a driver tip-in to exit out of DFSO. Further, an over-fueling condition may occur during the catalyst monitoring.

As stated earlier, the integrated air-fuel ratio catalyst monitor method is based on the knowledge that oxygen storage capacity of a catalyst decreases as the catalyst ages and/or degrades. Thus, by measuring an amount of fuel mass required to react with the stored oxygen, the age of the catalyst (and its degradation) may be estimated. Specifically, the amount of fuel mass required to react with stored oxygen in the catalyst after a sufficiently long DFSO event (DFSO duration>the second threshold) may be estimated.

A first integrated air-fuel ratio (IAF) method may calculate a total amount of fuel mass (FM) delivered from the end of the DFSO event until a switch in a downstream sensor. To elaborate, in the first integrated air-fuel ratio method, the total fuel mass consumed to react with stored oxygen in a catalyst prior to a downstream sensor switch is calculated. The total fuel mass supplied to an oxygen-saturated catalyst following a DFSO event until a downstream HEGO sensor switch can be represented by equation (1):

$$FM_c = \int_{t_{start}}^{t_{end}} AM(\phi_{in} - \phi_{out})\,dt \quad (1)$$

Here, $FM_c$ denotes the amount of fuel mass consumed to react with the stored oxygen in the catalyst after the end of a DFSO event at $t_{start}$ until the HEGO sensor switch at $t_{end}$. AM denotes the air mass flow rate entering the catalyst (e.g., measure by MAF sensor 120 and/or sensor 70), $\phi$ represents the equivalent fuel/air ratio, and the subscripts 'in' and 'out' denote positions before and after the catalyst, respectively. Downstream sensors after the catalyst may be located at mid-bed (for partial volume systems) or in the tailpipe (e.g., for full volume systems). $\phi_{in}$ can be measured by an upstream fuel-air sensor such as a UEGO sensor (e.g., sensor 126), and $\phi_{out}$ may be estimated from a downstream HEGO sensor (e.g., sensor 76).

Equation 1 can be approximated for catalyst oxygen storage capacity according to equation (2):

$$IAF = \int_{t_{start}}^{t_{end}} \frac{AM}{AF_{stoich}}(\phi_{in} - 1)\,dt \quad (2)$$

In equation (2), $AF_{stoich}$ represents the stoichiometric air-fuel ratio, and $\phi_{in}$ represents the equivalent fuel to air ratio in the catalyst feedgas. $\phi_{in}$ may be computed from the UEGO sensor reading, for example. According to equation (2), IAF may be negative under lean conditions (e.g., $\phi_{in}<1$) and positive under rich conditions. Accordingly, integrating over the time period may create an error in IAF computation, in particular if the rate at which air-fuel (AF) ratio transitions from lean to rich is slow. To mitigate this error, IAF monitors may use a calibratable AF setpoint for the time period where the sensor still reads lean and then based on a calibratable value switches to the UEGO sensor value. The AF setpoint is an additional parameter that may introduce an approximation error as well as additional complexity to the catalyst monitoring model.

It will be noted that equations (1) and (2) use an integration calculation that begins immediately after the end of a DFSO event at $t_{start}$. However, fuel delivered to the catalyst immediately upon exiting from DFSO may not react with stored oxygen in the catalyst and including this fuel in the calculation of the total amount of fuel may result in an erroneous calculation of the fuel required to react with stored oxygen. As such, a larger quantity of total fuel mass may be estimated leading to an inaccurate classification of the catalyst as a useful life or green catalyst. Greener catalysts may exhibit higher fuel mass than exhausted catalysts.

For example, an infinite amount of fuel diluted with air may be delivered to maintain an air-fuel ratio significantly above stoichiometry without depleting the catalyst, and without observing the switch in the output of the downstream sensor. It will be appreciated that computing the fuel mass in this example may not provide any information regarding the age of the catalyst.

A second integrated air-fuel ratio method, described in the present disclosure, calculates an amount of fuel delivered to the catalyst after an upstream sensor reaches stoichiometry. Thus, a fuel mass that actually reacts with stored oxygen may be computed. Herein, fuel mass provided prior to when the upstream sensor indicates stoichiometry may not be included in the calculation of total fuel mass.

In the second integrated air-fuel ratio method, a total fuel mass ($FM_2$ or $IAF_2$) required to react with stored oxygen may be calculated as shown in equation (3):

$$IAF_2 = \int_{t_{upstream=stoich}}^{t_{end}} \frac{AM}{AF_{stoich}}(\phi_{in} - 1)\,dt \quad (3)$$

Herein, the integration may be started at time equal to the time when the upstream sensor, e.g. a universal exhaust gas oxygen (UEGO) sensor, reaches stoichiometry. In other words, the integration starts only when an inlet air-fuel ratio (e.g. at inlet of the catalyst) reaches stoichiometry. The integration may be ended, as in the first method, when the downstream sensor (e.g. HEGO) undergoes a switch. As described earlier, the switch in the downstream sensor may be when the downstream sensor becomes richer than a first threshold. Herein, the first threshold may be substantially at stoichiometry. Further, the downstream sensor may be an oxygen sensor to detect an air-fuel ratio of exhaust gases exiting the catalyst. As an example, $t_{end}$ may be the time when mid-bed air-fuel ratio reaches stoichiometry. Herein, an air-fuel ratio sensor may be provided mid-bed in the emission device. Returning to 308 in FIG. 3, routine 300 may confirm if the upstream sensor has reached stoichiometry. As such, the upstream sensor indicates whether the feedgas is leaner than stoichiometric, richer than stoichiometric, or substantially at stoichiometric ratio. In one example, the upstream sensor positioned upstream from the emission device may be a UEGO sensor. If it is determined that the upstream sensor is not indicating stoichiometry, routine 300 continues to 310 to wait to start the integration calculation to compute the total fuel mass.

If, on the other hand, it is confirmed at 308 that the upstream sensor is at stoichiometry, routine 300 progresses to 312 to start the integration to compute fuel mass. Further, at 314, routine 300 disregards a first portion of fuel delivered before the upstream sensor reaches stoichiometry. The integration may continue until a downstream sensor switches from reading lean to reading rich.

At 316, therefore, routine 300 may determine if the downstream sensor has switched. As described earlier, the downstream sensor may be considered to be switched when the downstream sensor transitions to richer than a first threshold. The first threshold, herein, may be stoichiometry. Alternatively, the switching threshold may be distinct from stoichiometry. In another example, the downstream sensor may be considered to be switched if the output voltage from the downstream sensor is greater than a lean-rich voltage threshold. The lean-rich voltage threshold may be predetermined or calibrated to indicate a lean to rich transition. As an example, the lean-rich voltage threshold may be set to 0.45 V.

If it is determined that the downstream sensor has not switched, routine 300 continues to 318 to monitor the catalyst. Herein, fuel mass may still be reacting with oxygen stored in the catalyst. However, if it is determined that the downstream sensor has switched, routine 300 progresses to 320 to stop the fuel mass integration and to calculate the fuel mass using equation (3). The calculation of fuel mass, at 322, may ignore fuel injected prior to the upstream sensor reaching stoichiometry.

Next, at 324, routine 300 may evaluate if the catalyst is degraded. The evaluation may be based on a plurality of fuel mass integration data. This evaluation will be further described in reference to FIG. 4. At 326, the catalyst monitor may be stopped and engine operation may be returned to lean or stoichiometric operation per existing engine conditions.

Thus, the catalyst monitor may indicate degradation of the emission control device based on a total amount of rich products, for example. In one example, a method for catalyst monitoring may include, following a deceleration fuel shut-off (DFSO) duration, indicating degradation of an emission control device based on an amount of rich products required to cause a sensor to become richer than a first threshold, the indicating carried out when DFSO duration is greater than a second threshold, an integration based on inlet air-fuel ratio starting only after the inlet air-fuel ratio reaches stoichiometry. The first threshold may substantially be stoichiometry, and the sensor may be an air-fuel ratio sensor positioned downstream of the emission device. For example, the sensor may be an oxygen sensor that senses air-fuel ratio of exhaust gases emerging from the emission control device. In one example, the sensor may be a partial volume sensor and may be located at partial volume. In another example, the sensor may be a full volume sensor located at full volume of the catalyst.

The method, as mentioned, may include the integration based on inlet air-fuel ratio determined by a universal exhaust gas oxygen sensor positioned upstream from the emission device. The integration may be further based on air mass (AM) flow during delivery of rich products. Further still, the integration may disregard inlet air-fuel ratio prior to the inlet air-fuel ratio reaching stoichiometry. As such, the integration may not start until the inlet air-fuel ratio reaches stoichiometry as indicated by the upstream sensor. Further, the integration based on inlet air-fuel ratio may be ended when the downstream sensor is richer than the first threshold.

The amount of rich products required to cause the sensor to become richer than a threshold may be correlated to an amount of oxygen stored in the emission device. Thus, the indication of catalyst degradation may be based on the amount of oxygen stored in the catalyst(s).

The fuel mass calculation according to the second integrated air-fuel ratio method as shown in equation (3) may have to be calibrated for different blends of fuel. As ethanol content may be estimated and not measured, an error may be introduced in the catalyst monitor. Further, additional calibration may be desired. In order to reduce calibration efforts for distinct fuels, equation (3) may be normalized as follows, into equation (4):

$$\text{Modified\_IAF}_2 = \int_{t_{upstream=stoich}}^{t_{end}} AM(\phi_{in} - 1) dt \quad (4)$$

The integration in equation (4) is not dependent on $AF_{stoich}$, and is thus less sensitive to fuel type. In this way, fuel mass may be computed independent of fuel type.

Figure 4:
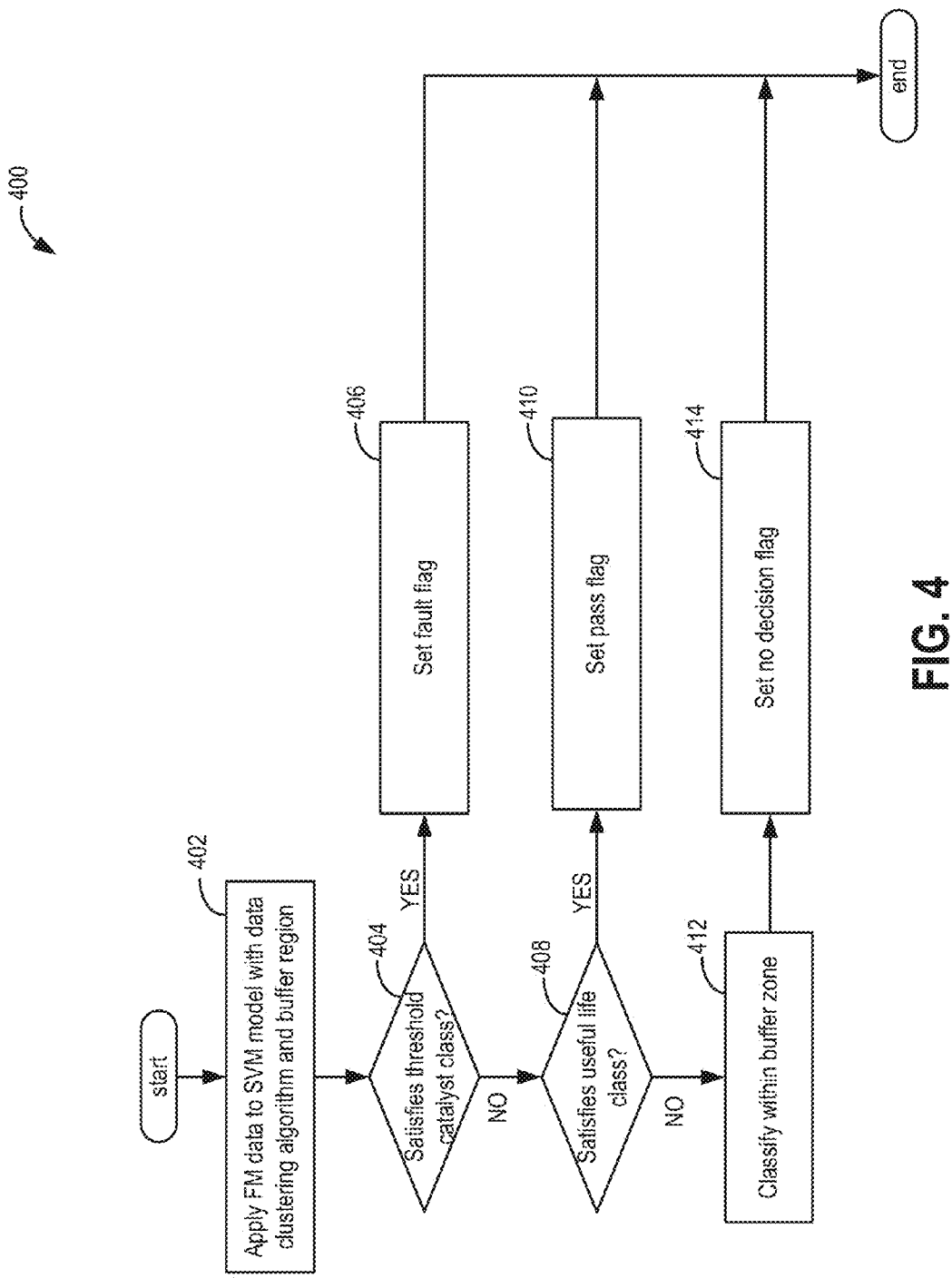

Turning now to FIG. 4, it illustrates routine 400 for assessing catalyst degradation from the fuel mass integration data of FIG. 3. Specifically, the calculated fuel mass data is applied to a support vector machine (SVM) model to determine if the catalyst has a useful life (greener catalyst) or is at threshold (exhausted catalyst).

At 402, fuel mass data collected in routine 300 may be applied to a SVM model. Data may be collected over a plurality of DFSO events. The SVM model employs a data clustering algorithm and includes a buffer region calibrated about a classifying plane.

FIG. 6 illustrates an example data classification map 600 of fuel mass data gathered using the first integrated air-fuel ratio method applied to a SVM model comprising a clustering algorithm and a buffer region about its classifying plane. FIG. 7 depicts an example data classification map 700 illustrating fuel mass data collected using the second integrated air-fuel ratio method applied to a SVM model.

A support vector machine (SVM) may be used in a catalyst monitoring method to predict catalyst function. During operation of a vehicle under selected conditions, various unclassified input parameters may be fed into a trained SVM model, and after a pre-defined number of samples have been classified, the total of each classification may be compared to a threshold to determine whether or not the catalyst is functioning. An SVM model is a representation of examples as points in space, mapped so that the examples of the separate categories are divided by a margin. New examples are then mapped into that same space and predicted to belong to a category based on which side of the margin they fall on.

SVMs use a signum function as a linear classifier to classify the unknown inputs into the two groups based on the training function wherein known inputs are used. Specifically, the known inputs are mapped onto high- or infinite-dimensional space and one or more hyper-planes are chosen that separate the inputs into the two spaced groups. In another example, to increase SVM performance and robustness and to reduce the risk of misclassification of inputs that can lead to false indication of catalyst degradation, clustering algorithms may be applied to the data to further organize (e.g., cluster) the data. Clustering may aid in reducing the number of support vectors used for defining an optimal hyper-plane.

For catalyst diagnostics, various input parameters may be supplied to the SVM. In one example, the input parameters may include total fuel mass consumed to react with stored oxygen in a catalyst prior to a downstream HEGO sensor switch.

FIGS. 6 and 7 show example fuel mass data classification maps 600 and 700, respectively, using an SVM algorithm with Fuzzy C-means clustering that classifies the data into two separate groups. Each map (600 and 700) includes fuel mass (FM) along the y-axis and catalyst temperature along the x-axis. Map 600 depicts full useful life catalysts (FUL) in area 610 (depicted as circles) and threshold catalysts in area 630 (depicted as squares). In the example of map 600, a set of fuel mass data points calculated from equation (2) (or first integrated air-fuel ratio method) have been applied to an SVM algorithm. Map 700 portrays FUL catalysts in area 710 (depicted as circles) and threshold catalysts in area 730 (depicted as squares). Further, fuel mass data in map 700 may be derived from either equation (3) or equation (4) (or second integrated air-fuel ratio method). Fuel mass data in map 700 may not include fuel injected into the catalyst prior to the upstream sensor reading stoichiometry.

Each map uses an SVM algorithm with Fuzzy C-means clustering and includes a respective buffer region, e.g. buffer region 654 in map 600 and buffer region 754 in map 700. The buffer regions 654 and 754 may be calibrated around a respective classification plane based on the distribution of data, clustering, tolerances for misclassification, and the like. Choosing a wider buffer region, to a certain extent, can increase the accuracy but at the same time may reduce the number of data points for which diagnoses can be made. Consequently, the calibration may depend on the trade-off between error tolerance and desired detection frequency. Data points falling within the buffer regions 654 and 754 may not be classified (e.g., no decision may be made on whether the data points in the buffer region belong to the FUL or the threshold class). By including buffer region 654 (defined by classification planes 650) and buffer region 754 (defined by classification planes 750), misclassifications near or adjacent to the classifying plane can be reduced, and the model accuracy may be increased.

It will be observed that the second integrated air-fuel ratio method (map 700) includes fewer (e.g. only one) catalysts in the buffer region 754. Conversely, map 600 which uses fuel mass data obtained via the first integrated air-fuel ratio method shows about 5 catalysts in or bordering the buffer region 654. As such, the second integrated air-fuel ratio method provides a clearer buffer region between the FUL and threshold catalysts allowing a more accurate characterization of the catalysts.

A histogram distribution map 800 corresponding to the SVM classification of FIG. 6 is illustrated in FIG. 8, showing the distribution of fuel mass data on the x-axis along with their frequency on y-axis. A histogram distribution map 900 corresponding to the SVM classification of FIG. 7 is illustrated in FIG. 9, showing the distribution of fuel mass data (obtained using either equations (3) or (4)) on the x-axis along with their frequency on y-axis. Distribution map 800 shows distribution 802 for threshold catalysts and distribution 804 for FUL catalysts as obtained by using fuel mass calculations from equation (2). Distribution map 900 illustrates distribution 902 for threshold catalysts and distribution 904 for FUL catalysts using fuel mass calculations obtained using either equation (3) or equation (4). It will be observed that distributions 902 and 904 are narrower relative to respective distributions 802 and 804. The narrower distributions in 902 and 904 indicate a more reliable and accurate method for determining catalyst degradation.

Returning to routine 400, at 404, if the fuel mass data satisfies the threshold catalyst class (e.g., area 730 in FIG. 7), then routine 400 proceeds to 406 where a fault flag is set. Further, an engine operating parameter may be adjusted responsive to the indication of degradation of the catalyst. The engine operating parameter may be engine speed, engine load, vehicle speed, fuel injection, torque output, etc. The engine system in the vehicle may continue to operate, however performance and/or drivability may be reduced. In one example, engine speed and/or an engine speed limit may be reduced which may lower engine torque output. In another example, vehicle speed may be reduced. Further, fuel injection may be adjusted such that a reduced level of regulated emissions may be exhausted from the engine even with a threshold catalyst. As such, these adjustments to one or more engine operating parameters may be proportional to a degree of degradation indicated by the catalyst monitor.

If the fuel mass data does not satisfy the threshold catalyst class, routine 400 continues to 408 to determine if the fuel mass data satisfies a useful life class (e.g., area 710 in FIG. 7). If it is determined that the fuel mass data satisfies the useful life class, routine 400 proceeds to 410 where a pass flag is set. If not, routine 400 classifies the fuel mass data within the buffer zone (e.g., buffer region 754 in FIG. 7) at 412. Further, routine 400 proceeds to 414 where a no decision flag is set.

As an example, the catalyst monitoring system may perform a plurality of classifications corresponding to a plurality of DFSO events in order to accurately and robustly classify the catalyst degradation status. In particular, a larger number of classifications may be performed if the catalyst is classified within the buffer zone or near the buffer zone as compared to if the catalyst classification falls clearly within either the threshold or useful life regions. As an example, the results from the plurality of classifications may be averaged, or statistically combined using known methods, to evaluate catalyst degradation. As a further example, a larger number of classifications may be performed when the catalyst is classified as FUL or within the buffer zone in order to more accurately diagnose a threshold catalyst.

Accordingly based on the classification of the FM data via the SVM model, an indication may be provided to the vehicle operator, for example via a display device. For example, if a fault flag is set a warning indication notifying the operator of catalyst degradation may be provided. As a further example, if the SVM classification determines the catalyst is still within its useful life and a pass flag is set, no indication may be provided to the vehicle operator. As a further example, if the catalyst monitoring results in a classification within the buffer zone, a warning indication notifying the operator of impending catalyst degradation may be provided.

Turning now to FIG. 5, it illustrates a timeline 500 showing trends in vehicle operating conditions for performing a catalyst monitoring method following a DFSO event. The depicted operation timeline of FIG. 5 may be in an example engine which includes a first UEGO sensor located upstream of an emission control device to monitor feedgas air-fuel ratio (also termed, inlet air-fuel ratio). The example engine may also include a second UEGO sensor located mid-bed within the emission control device, and a HEGO sensor positioned downstream of the emission control device. Variation in an amount of fuel injected into the example engine is indicated by plot 502 in timeline 500, air-fuel ratio readings from the first UEGO sensor are depicted in plot 504, air-fuel ratio readings from the second UEGO sensor are at dashed plot 506, and a HEGO sensor voltage output is shown at plot 508. All the above are plotted against time on the x-axis. Further, time increases along the x-axis from left to right. Line 514 represents a stoichiometric HEGO voltage output. Line 516 represents a lean to rich threshold voltage transition or a switching threshold. In one example, line 516 may indicate a voltage of 0.45 V. Line 515 represents a threshold lean voltage. It will be appreciated that even though the example timeline 500 features UEGO and HEGO sensor outputs, other suitable exhaust gas sensors may also be used without departing from the scope of this disclosure. As an example, the upstream sensor may be a HEGO sensor and/or the downstream sensor may be a UEGO sensor without departing from the scope of the present disclosure.

Prior to t1, the vehicle may be running at stoichiometric engine operation as indicated by all four plots which are around stoichiometric. At t1, a DFSO event may be initiated, for example while coasting downhill, resulting in a drop in amount of injected fuel (plot 502), and a reduction in air-fuel ratio in feedgas (or upstream location), mid-bed location, and downstream of the emission control device. As shown in FIG. 5, the response of second UEGO sensor output indicative of air-fuel ratio at mid-bed location may be relatively slower than the response of first UEGO sensor output indicative of air-fuel ratio in the feedgas. Further, the HEGO sensor output indicative of air-fuel ratio downstream of the catalyst may be slower than the second UEGO output.

Between t1 and t3, during the DFSO event, fuel may not be injected while the engine continues to rotate and pump air through the emission device. Thus, during DFSO, the catalysts in the emission device may be saturated with oxygen.

At t2, the HEGO output decreases below threshold lean voltage (line 515) and remains below the threshold lean voltage. Thus, if the entry condition for the catalyst monitor is HEGO output being less than the threshold lean voltage, the entry condition may be met at t2 and catalyst monitoring may be activated after DFSO event ends.

The DFSO event may persist until conditions are met for exiting out of DFSO. Therefore, in response to a driver tip-in at t3, the engine comes out of DFSO operation and the DFSO event may be ended. In one example, a catalyst monitor entry condition may be a sufficiently long DFSO event to saturate the catalyst with oxygen. In the depicted timeline 500, the DFSO event lasts from t1 until t3 and may be of adequate duration to fully saturate the emission control device. If the DFSO event duration is of shorter duration e.g. shorter than a duration threshold, the catalyst monitoring may not be performed.

At t3, the amount of fuel injection (plot 502) increases above stoichiometric engine operation levels and since catalyst monitor entry conditions are met, catalyst monitoring may begin. Accordingly, the engine may be operated with rich fuel injection in response to the driver tip in when catalyst monitoring is performed. As an example, the engine may be over-fueled (relative to stoichiometry) with an amount of fuel equivalent to $\Delta F$. The amount of over-fueling, $\Delta F$, may increase substantially linearly with the freshness of a catalyst. In other words, the amount of over-fueling may reduce with an increase in age of the catalyst.

In response to the increase in fuel injection, first UEGO output indicative of feedgas air-fuel ratio (plot 504) begins to increase at t3, and second UEGO output indicative of mid-bed air-fuel ratio (plot 506) begins to increase just after t3. It will be noted that there may be a short "dead time ($t_d$)" before the feedgas air-fuel ratio undergoes any change. Similarly, the mid-bed air-fuel ratio also does not undergo a change during the "dead time". This may imply that oxygen is neither being stored nor released as the catalyst is already saturated with oxygen from the DFSO event, and the feedgas is still leaner than stoichiometry. Therefore, even though fuel is injected (plot 502), at and immediately after t3, this initial amount of fuel may not be included in the fuel mass calculation since there is no change in the oxygen capacity of the catalyst.

As observed by plot 508, the HEGO output begins to increase from below threshold lean voltage (line 515) much after t3. At t4, the first UEGO sensor output may reach stoichiometry. Therefore, an integration to compute fuel mass according to equation (3) and (4) may be started at t4.

Catalyst monitoring continues until t5, when HEGO output meets and rises above the lean-rich voltage threshold (line 516). At t5, therefore, the catalyst monitoring is stopped, and over-fueling may be discontinued. Accordingly, after t5, the amount of fuel injection reduces, and engine operation may be returned to stoichiometric operation to reduce the amount of hydrocarbon emissions. Further, beyond t5, air-fuel ratio readings from the first UEGO sensor reduce to stoichiometric, as does the HEGO output.

As described earlier in regards to equations (3) to (4), fuel mass injected to the catalyst may be estimated by an integration calculation based on the first UEGO air-fuel ratio output and the air mass entering the catalyst. The integration calculation may be from a first time corresponding to when the first UEGO sensor indicates stoichiometry until a second time when the HEGO sensor undergoes a switch from lean to rich. In FIG. 5, t4 may correspond to the first time when the integration calculation may be started, and t5 may correspond to the second time when HEGO sensor undergoes the switch. Shaded region 524 may represent the integral of the first UEGO sensor signal (e.g., $\phi_{in}$ term in equations 3 and 4) from t4 to t5. It will be noted that this integration may be performed specifically when an exit air-fuel ratio may not be accurately known such as with a HEGO sensor.

However, when a mid-bed air-fuel ratio sensor (e.g. UEGO sensor) is present, as in the example of FIG. 5, the integration calculation may be slightly different. In one example, the integration may begin from time t3 when a mid-bed UEGO sensor is present. Herein, the integration may encompass a total area corresponding to the sum of region 526 and shaded region 524. Accordingly, fuel mass estimation may include an area depicted by shaded region 524 (slanted lines) and an area depicted by region 526 (horizontal lines). Since the mid-bed air-fuel ratio from the second UEGO sensor and feedgas air-fuel ratio from the first UEGO sensor overlap from time t3 to t3+$t_d$, the integration area corresponding to that overlap time would be zero. Further, region 526 may be considerably smaller than shaded region 524 and may be disregarded in the integration calculation. In the absence of an accurate air-fuel ratio at the exit of the catalyst, the catalyst monitor may assume that the air-fuel ratio at the exit is substantially at stoichiometry, which may be an acceptable assumption as seen in FIG. 5.

It will also be noted that the first integrated air-fuel ratio method represented by equation (2) may add an area shown by dotted region 528 to compensate for fuel delivered immediately following the exit out of DFSO until the first UEGO sensor reaches stoichiometry. However, as explained earlier, this additional fuel may not be used to react with the stored oxygen in the catalyst, and therefore, may be omitted in computing fuel mass according to equations (3) and (4). The second integrated air-fuel ratio method, accordingly, does not add region 528 to the computation of fuel mass. The present disclosure uses the calculation shown in equations (3) or (4) to compute fuel mass. Further, as described above, the fuel mass may be estimated by combining regions 524 and 526, region 524 bordered on the left at time t4 when first UEGO sensor (or feedgas) reaches stoichiometry and bordered on right at time t5 when HEGO sensor undergoes the switch. As such, region 526 may be smaller relative to region 524, and therefore, it may also be disregarded in the fuel mass computation.

Thus, an example catalyst monitor method may include computing a total fuel mass injected following a deceleration fuel shut-off (DFSO) event, the computing including an integration based on an air mass flow and an air-fuel ratio from a first time corresponding to when a first exhaust gas sensor indicates stoichiometry until a second time when a second exhaust gas sensor undergoes a switch, and indicating degradation of a catalyst based on the total fuel mass. Herein, the first exhaust gas sensor may be a universal exhaust gas sensor, and the second exhaust gas sensor may be a heated exhaust gas oxygen sensor. The switch of the second exhaust gas oxygen sensor may comprise the second exhaust gas oxygen sensor crossing a lean-rich voltage threshold (line 516 in timeline 500 of FIG. 5). Further, the method may comprise disabling the computing of the total fuel mass when a duration of the DFSO event is lower than a first threshold. The first threshold, herein, may be a duration threshold. Computing the total fuel mass injected may disregard fuel injected before the first exhaust gas sensor indicates stoichiometry.

Turning now to FIG. 10, it illustrates map 1000 showing a variation in computed fuel mass (via equation (3) or equation (4)) plotted along y-axis with catalyst temperature plotted along x-axis. Plot 1002 in map 1000 of FIG. 10 may be similar to the SVM plot in FIG. 7 for a useful life catalyst. As observed, fuel mass increases steadily until a catalyst temperature of about 1300 F, and then reduces.

FIG. 11 depicts map 1100 which illustrates an example relationship between over-fueling (ΔF) and computed fuel mass (from either equation (3) or equation (4)). As shown, over-fueling is plotted along y-axis and computed fuel mass is plotted along x-axis. Plot 1102 shows that over-fueling (ΔF) increases almost linearly with computed fuel mass. As mentioned earlier, a higher fuel mass calculated by equation (3) or (4) may indicate a greener catalyst with a longer useful life. Therefore, a larger amount of over-fueling may be demanded during a catalyst monitoring routine to react with the larger amount of stored oxygen in the greener catalyst.

In this manner, a system for monitoring an emission control device coupled to an exhaust system in a combustion engine may comprise a first exhaust gas sensor positioned in the exhaust system upstream of the emission control device, a second exhaust gas sensor coupled downstream of a volume of catalyst material of the emission control device, and a controller with computer-readable instructions stored in non-transitory memory for initiating a deceleration fuel shut-off (DFSO) based on an engine operating condition, following the DFSO, initiating fueling in response to a driver tip-in, following the driver tip-in, estimating a total amount of fuel mass delivered from when the first exhaust gas sensor attains stoichiometry to a switch of the second exhaust gas sensor, applying the estimated total amount of fuel mass to a support vector machine to generate a classification output, and indicating catalyst degradation based on the classification output. Herein, the first exhaust gas sensor may be a universal exhaust gas sensor, and the second exhaust gas sensor may be a heated exhaust gas oxygen sensor. The switch of the second exhaust gas sensor may include the second exhaust gas sensor crossing a lean-rich voltage threshold (e.g. line 516 in FIG. 5). The total amount of fuel mass may be based on an inlet air-fuel ratio and an air mass flow. The controller may include further instructions for ignoring a first amount of fuel mass delivered before the first exhaust gas sensor attains stoichiometry.

In this way, an emission control device may be monitored for degradation and/or aging. The age of the catalyst may be estimated by its capacity for oxygen storage during lean operating conditions. Instead of directly computing stored oxygen, the method herein computes a fuel mass required to react with the stored oxygen, thereby providing a metric for diagnosing the catalyst. Further, the present disclosure calculates the fuel mass by specifically computing fuel delivered only after a feedgas sensor (or a UEGO sensor monitoring feedgas) reaches stoichiometry. Thus, by excluding a portion of fuel mass delivered to the engine in a duration following a DFSO event until the UEGO sensor reads stoichiometry, a more accurate calculation of fuel mass reacting substantially exclusively with stored oxygen may be obtained. As such, the computation of fuel mass using the method in the present disclosure may be more reliable and less sensitive to noise. Overall, a more accurate estimation of catalyst age may be achieved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method for an engine, comprising:
responsive to a conclusion of a deceleration fuel shut-off (DFSO) event having a duration greater than a first threshold, indicating degradation of an emission device based on an amount of rich products required to cause a sensor to become richer than a second threshold, the amount of rich products determined by integrating an inlet air-fuel ratio, the integrating starting only after the inlet air-fuel ratio reaches stoichiometry.

2. The method of claim 1, wherein the second threshold is substantially at stoichiometry.

3. The method of claim 2, wherein the sensor is an air-fuel ratio sensor positioned downstream of the emission device.

4. The method of claim 3, wherein the sensor is a partial volume sensor.

5. The method of claim 3, wherein the sensor is a full volume sensor.

6. The method of claim 1, wherein the integrating the inlet air-fuel ratio to determine the amount of rich products further comprises integrating air mass flow during delivery of the rich products.

7. The method of claim 1, wherein the integrating ends when the sensor is richer than the second threshold.

8. The method of claim 7, wherein the inlet air-fuel ratio is determined by a universal exhaust gas oxygen sensor positioned upstream from the emission device.

9. A method for an engine, comprising:
computing a total fuel mass injected following a deceleration fuel shut-off (DFSO) event by integrating air mass flow and air-fuel ratio from a first time corresponding to when a first exhaust gas sensor indicates stoichiometry until a second time when a second exhaust gas sensor undergoes a switch; and
indicating degradation of a catalyst based on the total fuel mass.

10. The method of claim 9, wherein the first exhaust gas sensor is a universal exhaust gas sensor, and wherein the second exhaust gas sensor comprises a heated exhaust gas oxygen sensor.

11. The method of claim 9, wherein the switch of the second exhaust gas sensor comprises the second exhaust gas sensor crossing a lean-rich voltage threshold.

12. The method of claim 9, further comprising disabling the computing of the total fuel mass when a duration of the DFSO event is lower than a first threshold.

13. The method of claim 9, wherein computing the total fuel mass injected disregards fuel injected before the first exhaust gas sensor indicates stoichiometry.

14. A system, comprising:
an engine coupled to an exhaust system including an emission control device;
a first exhaust gas sensor positioned in the exhaust system upstream of the emission control device;
a second exhaust gas sensor coupled downstream of a volume of catalyst material of the emission control device; and
a controller with computer-readable instructions stored in non-transitory memory for:
initiating a deceleration fuel shut-off (DFSO) based on an engine operating condition;
following the DFSO, initiating fueling in response to a driver tip-in;
following the driver tip-in, estimating a total amount of fuel mass delivered from when the first exhaust gas sensor attains stoichiometry to a switch of the second exhaust gas sensor;
applying the estimated total amount of fuel mass to a support vector machine to generate a classification output; and
indicating catalyst degradation based on the classification output.

15. The system of claim 14, wherein the first exhaust gas sensor is a universal exhaust gas sensor.

16. The system of claim 14, wherein the second exhaust gas sensor is a heated exhaust gas oxygen sensor.

17. The system of claim 14, wherein the switch of the second exhaust gas sensor includes the second exhaust gas sensor crossing a lean-rich voltage threshold.

18. The system of claim 17, wherein the total amount of fuel mass is based on an inlet air-fuel ratio and an air mass flow.

19. The system of claim 18, wherein the controller includes further instructions for ignoring a first amount of fuel mass delivered before the first exhaust gas sensor attains stoichiometry.

* * * * *